Figures 1, 2:
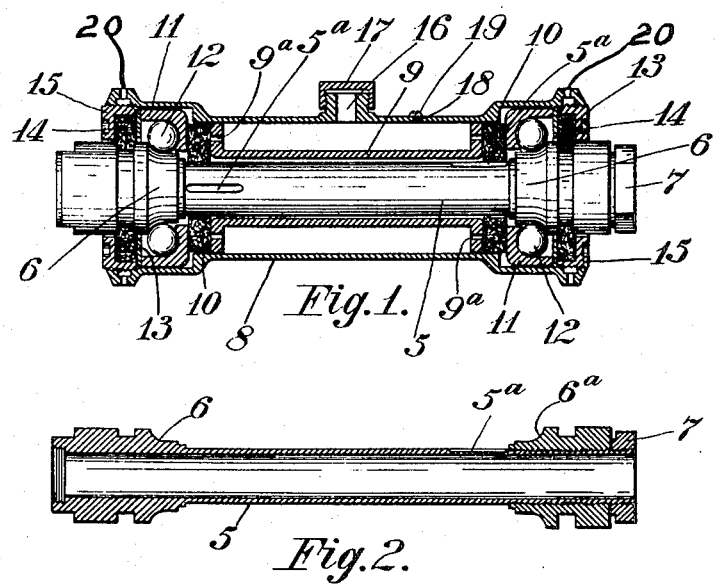

W. J. GRUBE.
LUBRICATING VEHICLE HUBS.
APPLICATION FILED APR. 27, 1912.

1,090,530.

Patented Mar. 17, 1914.

Witnesses
Benjamin Finckel
Gertrude Lowry.

Inventor
William J. Grube
by Finckel & Finckel
his Attorneys

UNITED STATES PATENT OFFICE.

WILLIAM J. GRUBE, OF DELAWARE, OHIO.

LUBRICATING VEHICLE-HUBS.

1,090,530.  Specification of Letters Patent.  Patented Mar. 17, 1914.

Application filed April 27, 1912. Serial No. 693,628.

*To all whom it may concern:*

Be it known that I, WILLIAM J. GRUBE, a citizen of the United States, residing at Delaware, in the county of Delaware and State of Ohio, have invented a certain new and useful Improvement in Lubricating Vehicle-Hubs, of which the following is a specification.

The object of this invention is to provide improved, simplified and effective means for lubricating hubs, especially such as are used in sulkies, bicycles, and motor-cycles, although the use of the invention is not confined to such.

The invention is embodied in the example herein shown and described, the features of novelty being pointed out in the appended claims.

In the accompanying drawings—Figure 1 is a vertical sectional view taken longitudinally of the hub. Fig. 2 is a longitudinal sectional view through the axle sleeve.

In the views 5 designates the axle sleeve, one end of which is provided with a fixed ball race or cone member 6 while the other is provided with a similar member 6ª threaded thereon and a lock nut 7 for holding the same.

8 designates the hub shell and 9 a metallic spool shaped structure fitting on the axle sleeve within the hub shell and forming an annular oil chamber or reservoir. The heads of the reservoir member are provided with oil ducts 9ª. Arranged on the axle sleeve within the hub and against the outer faces of the heads of the oil reservoir member are rings 10, 10 of absorbent material—felt for example.

11, 11, designate ball cups fitting in enlarged portions of the hub and in the plane of the ball races.

12 designates the balls and 13, 13 are metal retaining rings fitting against the outer ends of the cups.

14, 14, designate rings of felt placed against the ball retaining rings. Said rings 14, 14, extend into annular grooves in the race or cone members 6 and 6ª, as shown.

The characters 15, 15, designate dust caps threaded into the ends of the hub to hold the adjacent parts together.

The hub shell has an opening at 16 provided with a screw cap 17, the lubricant being supplied to the reservoir through said opening. At 18 is a vent for letting out air when the lubricant is supplied through the opening 16. The vent 18 is closed with a screw or threaded plug 19.

The axle sleeve is provided with several short longitudinal grooves 5ª, 5ª at the region of the absorbent rings 10, 10.

20 designate holes for the spokes of the wheel not shown.

In operation the oil passes from the reservoir through the ducts 9ª into the absorbent rings 10, 10, and thence to the grooves 5ª, and thence to the bearings in both directions.

From the foregoing construction it is plain that dust has no access to the bearings and that a single filling of the reservoir will afford an ample supply of lubricant for a long time.

What I claim is:

1. Means for lubricating hubs comprising, in combination, a hub shell, an axle sleeve, a spool-shaped member forming in conjunction with the hub shell a lubricant reservoir between said hub shell and axle sleeve, and an absorbent member on the end of said sleeve beyond the head of the spool and externally of the lubricant chamber to take lubricant from the reservoir, said axle sleeve provided with a duct for taking lubricant from said absorbent member.

2. Means for lubricating hubs comprising, in combination, a hub shell, an axle sleeve, a headed spool-shaped member forming in conjunction with the hub shell a lubricant reservoir between said hub shell and the axle sleeve, a head of said spool-shaped member provided with an oil duct, and an absorbent member on the end of said sleeve beyond the head of the spool and externally of the lubricant chamber to take lubricant from the reservoir, said axle sleeve provided with a duct for taking lubricant from said absorbent member.

3. Means for lubricating hubs comprising, in combination, a hub shell, an axle sleeve, a spool-shaped member forming in conjunction with the hub shell a lubricant reservoir between said hub shell and axle sleeve, and an absorbent member on the end of said sleeve beyond the head of the spool and externally of the lubricant chamber to take lubricant from the reservoir, said axle sleeve provided with a duct extending to the opposite faces of said absorbent member.

WILLIAM J. GRUBE.

Witnesses:
W. A. CAMTIGE,
BENJAMIN FINCKEL.